United States Patent [19]

Babbitt, Jr.

[11] 4,042,261
[45] Aug. 16, 1977

[54] MOUNTING FOR SECURING TOOLS TO VEHICLES

[75] Inventor: John H. Babbitt, Jr., Peoria, Ill.
[73] Assignee: Caterpillar Tractor Co., Peoria, Ill.
[21] Appl. No.: 683,567
[22] Filed: May 5, 1976
[51] Int. Cl.² .......................................... B60R 27/00
[52] U.S. Cl. ...................................... 280/762; 248/2
[58] Field of Search ............... 280/762; 403/370, 147, 403/154, 157; 248/2

[56] References Cited

U.S. PATENT DOCUMENTS

| | | | |
|---|---|---|---|
| 1,000,806 | 8/1911 | Henderson | 403/147 |
| 1,641,533 | 9/1927 | Davis | 403/147 |
| 3,643,904 | 2/1972 | McMullen | 403/370 |
| 3,841,774 | 10/1974 | Maxey | 403/370 |
| 3,958,888 | 5/1976 | Mullenberg | 403/370 |
| 3,972,636 | 8/1976 | Peter et al. | 403/370 |
| 3,995,824 | 12/1976 | Bauer | 403/370 |

*Primary Examiner*—Robert R. Song
*Attorney, Agent, or Firm*—Frank L. Hart

[57] ABSTRACT

A mounting for securing tools to vehicles having at least two nominally aligned, apertured ears extending from a side of the vehicle for mounting a work-performing device. The mounting includes a pair of stub shafts, one for receipt in each of the apertured ears, a base for a work-performing device, such as a winch, disposable about the ears, a pair of wedges carried by the base and interposed between the base and respective ones of the stub shafts, and bolts for effecting relative movement of the wedges on the base to tightly frictionally engage the base to the stub shafts, and thus to the vehicle.

12 Claims, 5 Drawing Figures

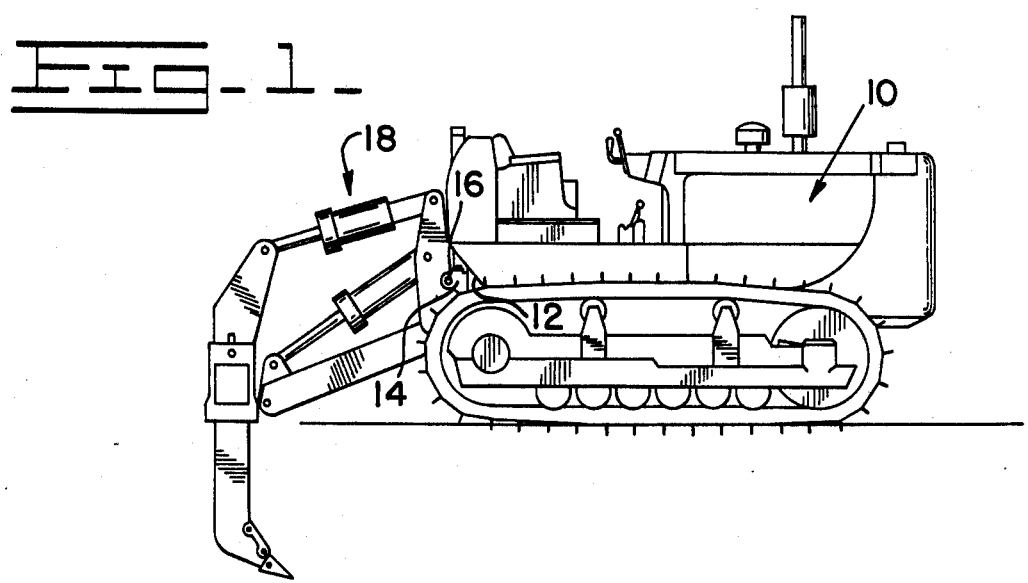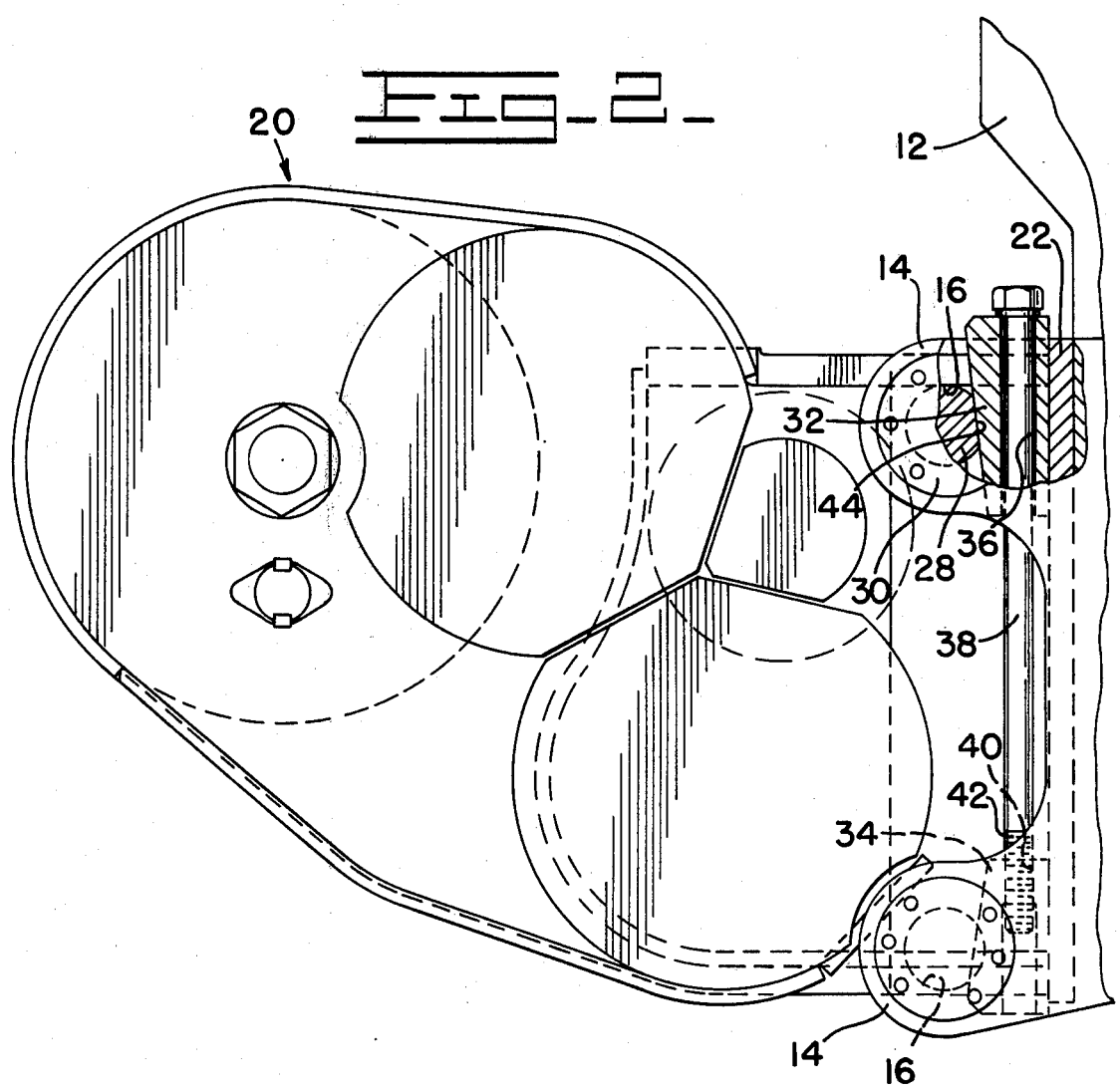

MOUNTING FOR SECURING TOOLS TO VEHICLES

BACKGROUND OF THE INVENTION

This invention relates to improved mounting constructions for mounting work-performing devices on vehicles. More specifically, it relates to mounting devices for mounting work-performing devices, such as winches, backhoes, etc., or the like, to vehicles, such as crawler-type tractors.

Many vehicles as, for example, crawler-type tractors, are employed for one principal purpose. Occasionally, however, it is desired to adapt the vehicle for performing some other type of work and, frequently, such adaptation requires the replacement of some work-performing means carried by the vehicle.

Frequently, the work-performing devices are carried by the vehicle by attachment to apertured ears extending rearwardly from the vehicle. In many instances, the nature of the work-performing device is such that only nominal alignment of the apertures and the ears is required to suitably secure the work-performing device to the vehicle. However, for other types of work-performing devices, such nominal alignment is insufficient, particularly when the work-performing device is driven by a power takeoff or the like. Thus, it has been necessary to use other mounting means in addition to the ears wherein precise alignment is attainable to accurately locate the work-performing device on the vehicle. The use of such additional means is, in a sense, redundant, and therefore wasteful. Moreover, because of the tolerances involved, considerable expense is entailed in fabricating such additional mounting means on the vehicle.

SUMMARY OF THE INVENTION

It is the principal object of the invention to provide a new and improved mounting construction whereby work-performing devices may be secured to a vehicle. More specifically, it is an object of the invention to provide such a mounting construction which can be used interchangeably with a variety of work-performing devices regardless of whether precise or relatively inexact positioning of the work-performing device on the vehicle is necessary.

An exemplary embodiment of the invention achieves the foregoing in connection with a vehicle construction including at least two nominally aligned, apertured ears extending from a side of the vehicle for mounting a work-performing device. The inventive mounting construction includes a pair of shaft means, one for receipt in each of the apertured ears. A base for a work-performing device is disposed about the ears and a pair of wedge means are carried by the base and interposed between the base and a respective one of the shaft means. Means are provided for effecting movement of the wedge means on the base to tightly frictionally wedge the base to the shaft means to thereby tightly secure the base to the vehicle. Inaccuracies in alignment in the ears are accommodated by independent movement of the wedge means.

In a preferred embodiment, the shaft means comprise stub shafts and the movement effecting means comprise threaded elements, one for each of the wedge means.

In one embodiment, each of the wedges includes a bore and the threaded elements include bolts at least partially extending into an associated bore. In one embodiment, the bolts are threadably received within the associated bore, while in another embodiment, the bolts slidably extend through the bores to be threadably received in nuts mounted on the base. In one case, the nuts may be secured to the base, while in another embodiment, the nuts may be defined by threaded bores in additional wedges adapted to cooperate with additional stub shafts in additional nominally aligned ears.

Other objects and advantages will become apparent from the following specification taken in connection with the accompanying drawings.

DESCRIPTION OF THE DRAWINGS

FIG. 1 is an elevational view of a vehicle, namely, a crawler-type tractor, mounting a ripper by means of rearwardly extending, nominally aligned apertured ears;

FIG. 2 is an enlarged, elevational view of a winch mounted on the vehicle by means of the apertured ears and a mounting construction made according to the invention. FIG. 2 has parts broken away for clarity;

DESCRIPTION OF THE PREFERRED EMBODIMENTS

Figure 3:
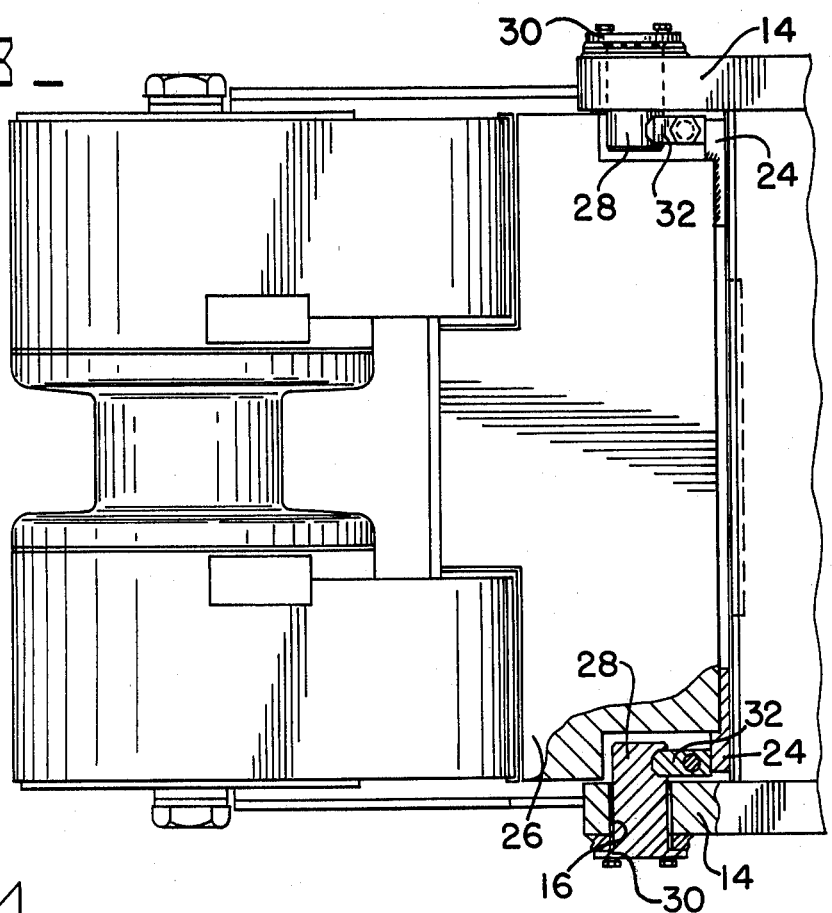
FIG. 3 is a plan view of the winch and vehicle structure with parts broken away for clarity.

A typical vehicle with which a mounting construction made according to the invention is ideally suited for use is illustrated in FIG. 1 in the form of a crawler-type tractor, generally designated 10. The rear frame 12 of the tractor 10 mounts four, rearwardly directed, apertured ears 14, only one of which is shown in FIG. 2. Typically, the ears 14 will be arranged on corners of a rectangle in upper and lower pairs and each includes an aperture 16. The apertures 16 in the upper ears 14 are nominally aligned as are the apertures 16 in the lower ears 14.

A conventional ripper, generally designated 18, is mounted on the tractor 10 through the use of the ears 14 in a conventional fashion. Those skilled in the art will recognize that to properly secure the ripper 18 to the vehicle, only nominal alignment of the ears 14 is required.

However, when it is desired to mount some other type of work-performing device as, for example, a winch, or a backhoe, frequently, much more precise alignment is required. FIGS. 2-5, inclusive, indicate a mounting construction made according to the invention for a work-performing device other than a ripper 18 which is shown as a winch, generally designated 20. The particular constructional details of the winch 20 form no part of the present invention and are conventional. For purposes of the present invention, the winch is provided with a base 22 which is adapted to be disposed in a vertical plane against the back or rear frame 12 of the tractor 10. As seen in FIG. 3, the base 22 may be formed of two plates 24 which are generally vertically extending and spaced apart a distance so that they may be received between the pairs of the ears 14. A plate 26 is secured to the plates 24, as by welding, and to the winch mechanism 20 in any suitable fashion.

As seen in FIGS. 2 and 3, there are provided a plurality of stub shafts 28, each having an enlarged head 30 receivable in a corresponding one of the apertures 16 in the ears 14. Interposed between each of the base plates 24 and the stub shafts 28 are upper and lower wedges 32 and 34 respectively. The upper and lower wedges are oppositely directed and, in the embodiment illustrated in FIG. 2, the upper wedge 32 is provided with an enlarged bore 36 through which a bolt 38 freely extends. The lower wedge 34 is provided with a threaded bore 40 for threadably receiving the threaded end 42 of the bolt 38. As a consequence, when the bolt 38 is turned in a clockwise direction, the wedges 32 and 34 will be drawn toward each other. By reason of their abutment with their corresponding one of the plates 24 and the stub shafts 28, the base plate will be tightly frictionally wedged against the back or rear frame 12 of the tractor 10.

If desired, each of the stub shafts may be provided with a guide groove 44 for receipt of the corresponding wedge member 32 or 34.

Because the assemblage of the wedge members 32 and 34 is not keyed to the base in a vertical direction, tightening of the bolt 38 may cause one or the other of the wedges 32 and 34 to move more on the base than the other. Thus, if the base is originally properly oriented with respect to the frame of the vehicle, the ability to allow such differential movement compensates for any misalignment in the ears 14 to enable precise positioning of the work-performing device on the tractor 10.

Figure 4:
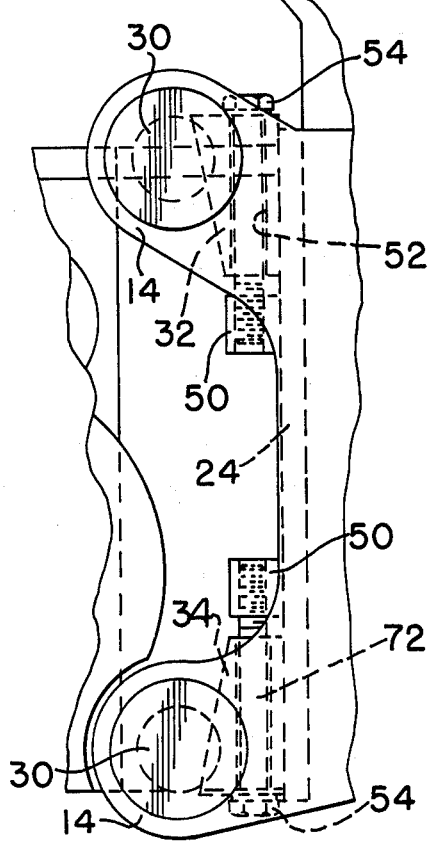
FIG. 4 is a fragmentary, enlarged view of a modified embodiment of the invention.

FIG. 4 illustrates a modified embodiment of the invention wherein each of the four wedges employed is moved independently of all others. Specifically, for each of the wedges, the corresponding one of the base plates 24 is provided with a nut 50 which may be welded thereon. Each wedge 32 or 34 is provided with a bore 52 slidably receiving a bolt 54. The threaded end of each bolt 54 is received in the associated one of the nuts 50 and by selective manipulation of a given one of the bolts 54, the associated wedge 32 or 34 may be employed to provide the desired tightening action.

In all other respects, the embodiment of FIG. 4 is the same as that of FIGS. 2 and 3.

Figure 5:
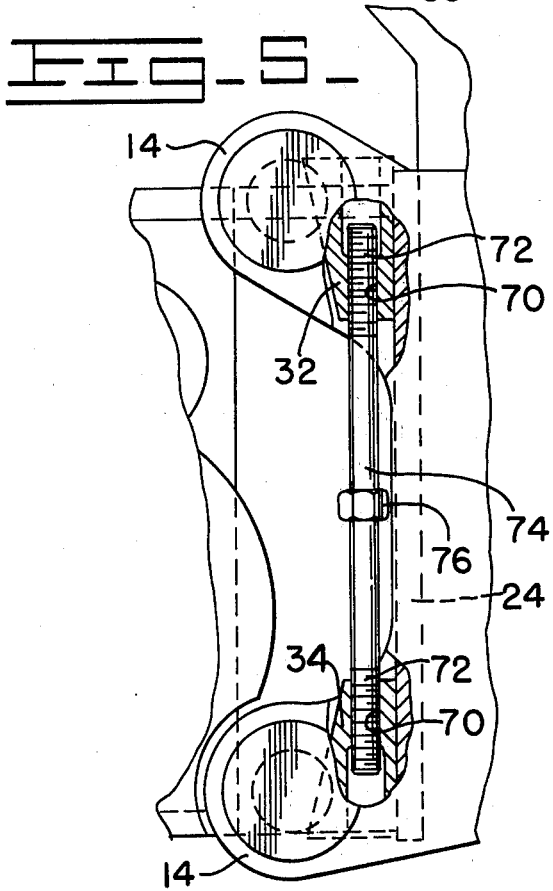
FIG. 5 is a fragmentary, enlarged view of still another embodiment of the invention.

FIG. 5 illustrates still a further modified embodiment of the invention. Like the embodiment illustrated in FIGS. 2 and 3, a single bolt is employed to effect the movement of two wedges. More specifically, upper and lower wedges 32 and 34 are provided and each includes an interior, threaded bore 70 for receiving the opposite threaded ends 72 of a bolt 74 provided with a hexagonal formation 76 intermediate its ends whereby the same may be turned. The ends 72 are oppositely threaded so that upon rotation of the bolt 74 in a given direction, the wedges 32 and 34 will move in the same direction or in opposite directions, as the case may be.

In all other respects, the embodiment of FIG. 5 may be identical to that of FIGS. 2 and 3.

From the foregoing, it will be appreciated that each of the embodiments of the invention permits the effecting of a tight securement for mounting of a work-performing device to a vehicle and, specifically, nominally align mounting ears thereon in such a way that precise alignment can be achieved. By properly orienting the base of the work-performing device on the vehicle prior to effecting movement of the wedges, such positioning can be maintained during tightening of the wedges by reason of the ability of the wedges, even when paired, to move independently of the others.

If desired, to assist in orienting the base of the work performing device on the vehicle, the work performing device may be provided with pins extending toward the vehicle to be received in pilot bores therein or to confront the sides of the conventional opening in the bevel gear case for the power takeoff.

Thus, a single, standard mounting ear configuration can be employed to mount work-performing devices of different kinds, whether or not precise orientation of the work-performing device to the vehicle is required. Consequently, there is no need for provision of redundant mounting systems nor is the mounting construction expensive by reason of tolerance requirements.

I claim:

1. In a vehicle construction including at least two, nominally aligned, apertured ears extending from a side of the vehicle for mounting a work-performing device, the combination of:
   a pair of shaft means, one for receipt in each of said apertured ears;
   a base connected to said work-performing device disposable adjacent said ears;
   a pair of wedge means carried by said base and interposed between said base and a side of a respective one of said shaft means; and
   means for effecting movement of said wedge means on said base to tightly frictionally wedge said wedge between said base and said shaft means.

2. The invention of claim 1 wherein each said shaft means comprises a stub shaft.

3. The invention of claim 1 wherein said movement effecting means comprise threaded elements.

4. The invention of claim 1 wherein each said wedge means includes a bore and said movement effecting means comprises a bolt for each of said wedge means and at least partially extending into the associated bore.

5. The invention of claim 4 wherein each said bolt is threadably received within its associated bore.

6. The invention of claim 5 further including a nut structure for each of said bolts and mounted on said base, each said bolt being slidably received in its associated bore and threadably received in its associated nut.

7. The invention of claim 6 wherein each said nut structure is defined by a threaded bore in additional ones of said wedge means.

8. The invention of claim 6 wherein each said nut structure comprises a nut secured to said base.

9. The invention of claim 1 wherein there are two additional, nominally aligned, apertured ears, two additional ones of said shaft means, and two additional ones of said wedge means, pairs of said wedge means being oppositely directed; and said movement effecting means comprising bolts interconnecting the wedge means in a pair.

10. The invention of claim 9 wherein said bolts are threadably connected to both wedges means in their associated pair.

11. The invention of claim 9 wherein said bolts slidably extend through one of the wedge means in their associated pair and are threadably received in the other bolt means of the associated pair.

12. The invention of claim 5 further including a nut structure for said bolts, each said bolt being slidably received in its associated bore and threadably connected to said nut structure.

* * * * *